Patented June 26, 1928.

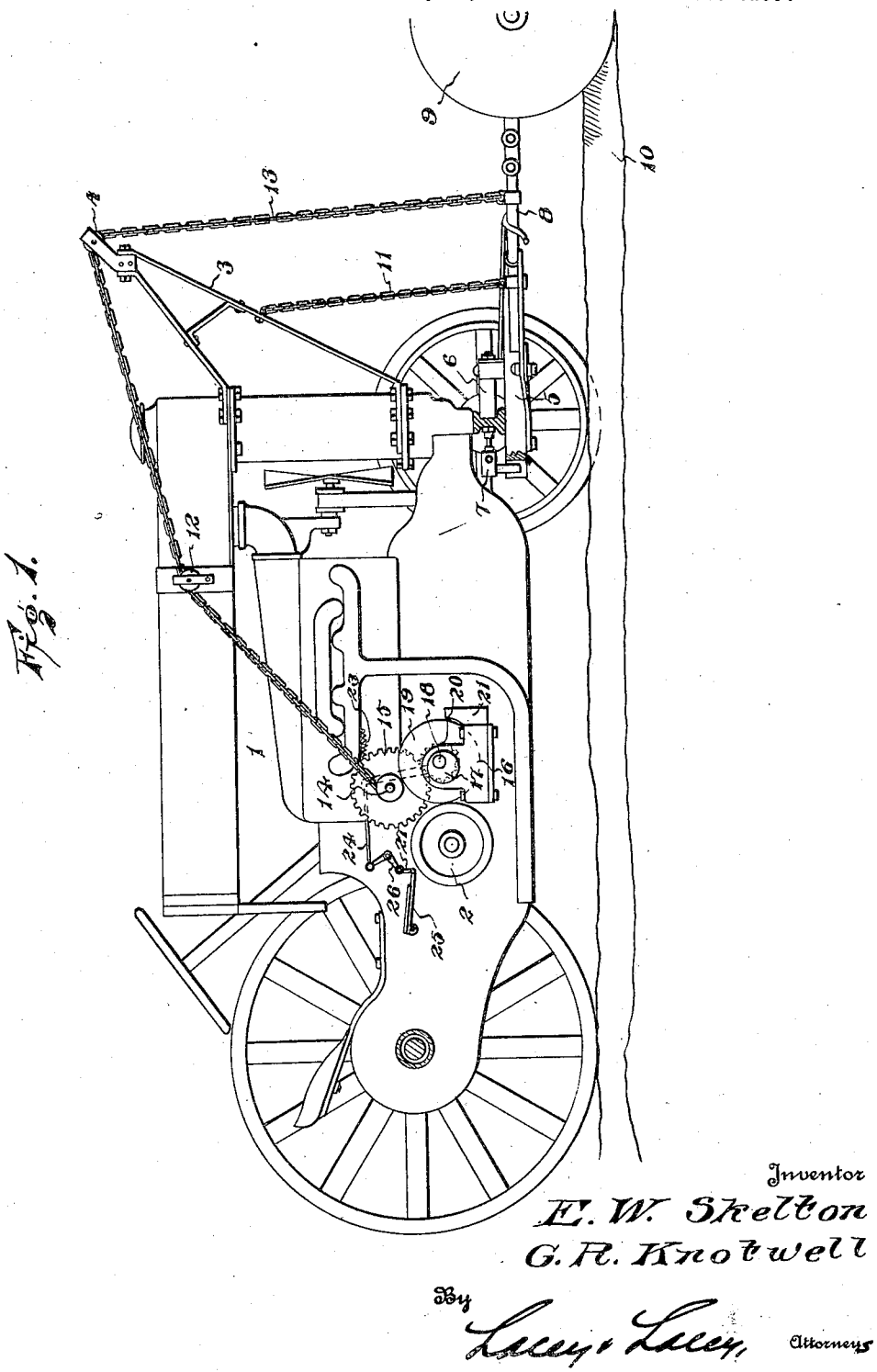

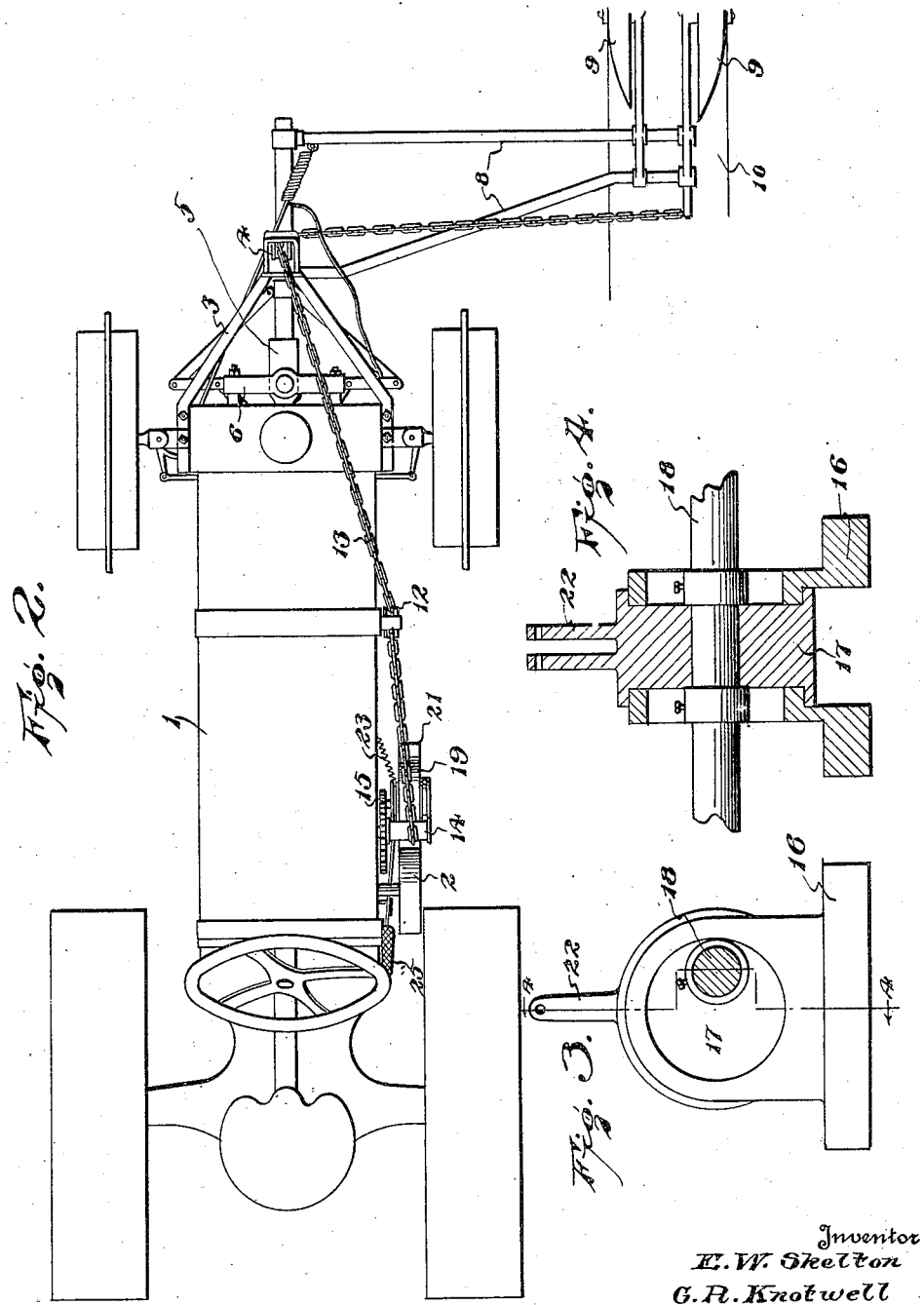

1,674,926

UNITED STATES PATENT OFFICE.

EARL W. SKELTON AND GLENN R. KNOTWELL, OF WAUNETA, NEBRASKA.

TRACTOR GUIDE.

Application filed July 12, 1927. Serial No. 205,202.

Our invention relates to tractor steering devices of that class in which steering disks or runners are arranged to travel in a previously formed furrow in advance of the tractor and are connected with the usual steering gear of the tractor so that as the machine travels over a field it will be caused to follow a path parallel with the furrow in which the disks or runners are located. The object of the present invention is to provide simple means which may be easily mounted upon the side of the tractor and whereby the power of the tractor may be utilized to lift the steering runners or disks from the furrow in which they may have been operating to be relocated in a furrow which has just been formed so as to guide the tractor on its return trip, or may be supported in an elevated position when the machine is to be driven from field to field or to a place of storage. The invention is illustrated in the accompanying drawings and consists in certain novel features which will be hereinafter first fully described and ing bar 5, aids in supporting the weight of the said bar and thereby prevents the sagging of the steering head under the weight of the arms 8 and the disks or runners carried by said arms.

Mounted upon the tractor in rear of the mast 3 in any convenient manner, as by being secured upon the side of the fuel tank, is a guide pulley 12 and a chain or cable 13 is secured at its forward end to the arms 8 or to the frame upon which the runners or disks are directly mounted, the said chain or cable passing over the guide pulleys 4 and 12 and being secured at its rear end to a drum or winding shaft 14 which is fixed to the shaft or axle of a gear wheel 15, as shown, the said shaft or axle being supported in any convenient manner upon the side of the engine block or crank casing above and in advance of the power take-off pulley 2, as shown most clearly in Fig. 1. Below the gear 15 and in advance of the power take-off pulley 2, a supporting block or frame 16 is secured upon the side of the block 2. A link 24 is also attached to the upper end of the crank or lever 22, and this lever is connected with a foot pedal 25 through an angle lever 26 and a short link 27, as shown clearly in Fig. 1. The pedal 25 is mounted upon the transmission casing of the tractor within convenient reach of the operator so that when the runners or steering disks are to be raised the result can be accomplished by pressing upon the pedal 25 and holding the same depressed through the desired interval.

It will be seen from the foregoing description, taken in connection with the accompanying drawing, that we have provided an exceedingly simple mechanism whereby the power of the tractor may be utilized to lift the steering disks or runners into an inoperative position and to support them in that position while the tractor is being turned or is being driven to another field or to a place of storage.

Having thus described the invention, we claim:

1. In apparatus for the purpose set forth, a winding drum, a gear fixed to said drum and mounted upon the side of a tractor, a friction pulley mounted in advance and in the same vertical plane with the power take-off pulley of the tractor, a brake block in advance of the friction pulley, a pinion fixed to the friction pulley and meshing constantly with said gear, and an eccentric bearing for the friction pulley whereby the pulley may be caused to engage the power take-off pulley or the brake block.

2. In apparatus for the purpose set forth, a winding drum, a gear fixed to said winding drum, and mounted on the side of a tractor, a shaft mounted below the gear, a friction pulley on said shaft, a pinion on said shaft meshing with the gear, eccentric bearings for the friction pulley shaft, a brake block in advance of the pulley, a spring acting upon the eccentric bearings to normally hold the friction pulley in engagement with the brake block, a pedal in rear of the winding drum, and connections between the pedal and the eccentric bearings whereby the said bearings may be shifted to cause the friction pulley to engage the brake block or the power take-off pulley of the tractor.

In testimony whereof we affix our signatures.

EARL W. SKELTON. [L. S.]
GLENN R. KNOTWELL. [L. S.]